Sept. 20, 1966 H. KERSTING 3,274,075
DEVICE FOR AERATING FERMENTING LIQUIDS IN PARTICULAR
FOR THE PRODUCTION OF BAKERS' YEAST
Filed Oct. 14, 1964 2 Sheets-Sheet 1
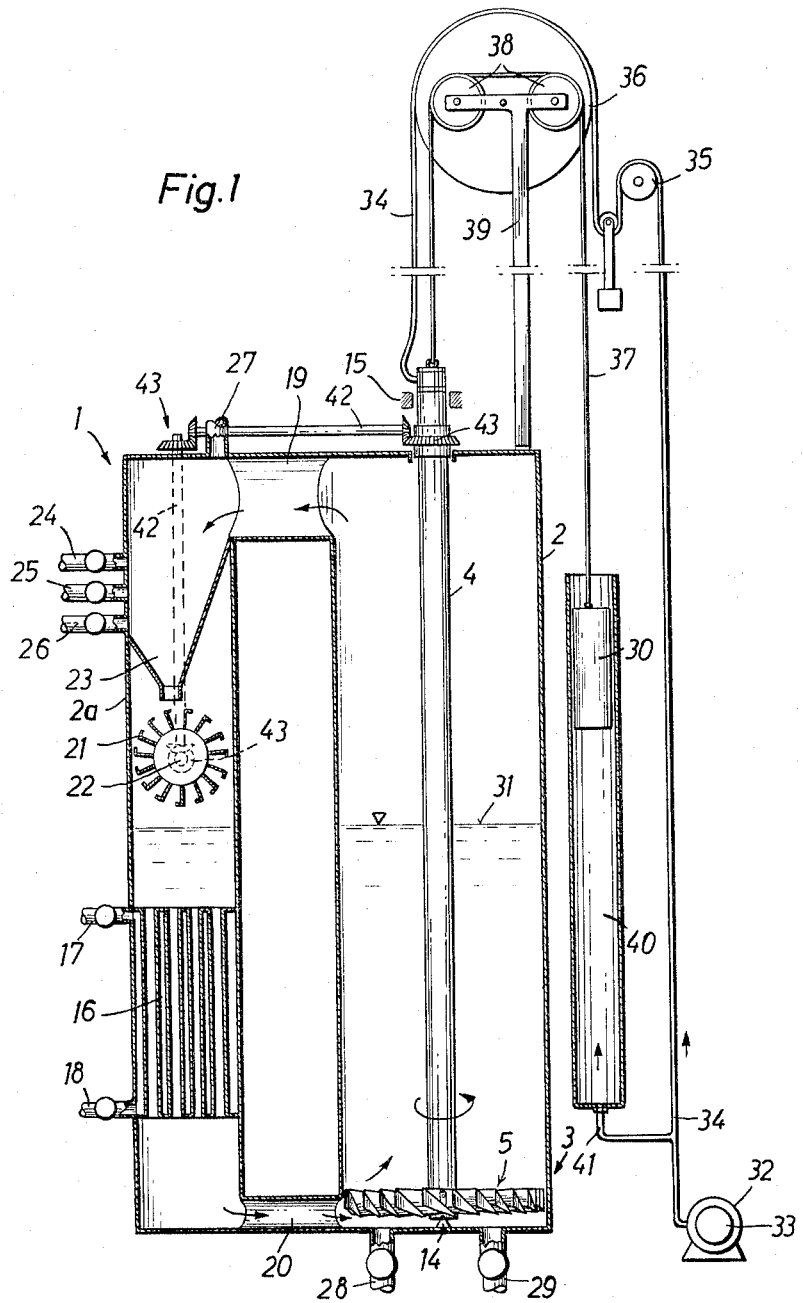
INVENTOR
HANS KERSTING
BY Lowry & Rinehart
ATTYS.

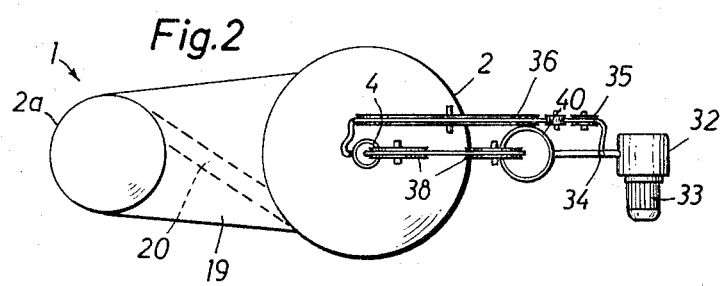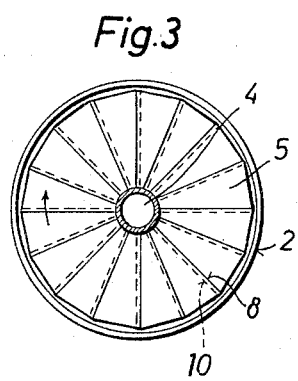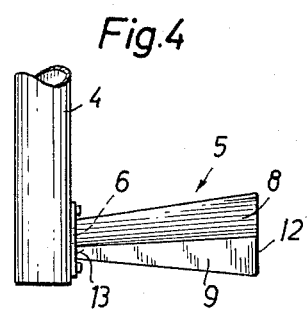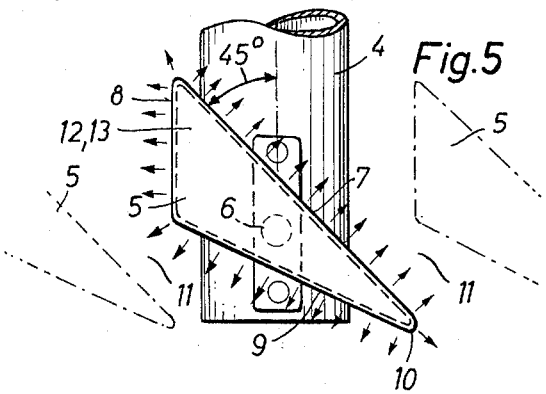

United States Patent Office 3,274,075
Patented Sept. 20, 1966

3,274,075
DEVICE FOR AERATING FERMENTING LIQUIDS IN PARTICULAR FOR THE PRODUCTION OF BAKERS' YEAST
Hans Kersting, Am Heidkamp 19, Ratingen, Germany
Filed Oct. 14, 1964, Ser. No. 403,773
Claims priority, application Germany, Oct. 15, 1963, K 51,088
11 Claims. (Cl. 195—142)

The invention relates to a device for aerating fermenting liquids, for instance saccharine mashes, principally for the production of bakers' yeast.

It is already known, to ferment a saccharine mash in a continuous process. For this, the mash is exposed by the introduction of air through suitable means, to a continuous aeration and the fermented mash is after de-aeration, again returned to the aeration device. The resulting quantity of fresh-cultured yeast is continuously drawn off, a nutrient solution being added in a volume corresponding to that of the withdrawn quantity of yeast.

In such a process, the sufficient supply of oxygen to the yeast cells, is of particular importance. The quantity of oxygen available in the mash for respiration by the yeast cells is one of the essential conditions for the functioning of the production process. At the same time, the manner and means whereby the required quantity of atmospheric oxygen is made available, is an important factor in the economic costing of the industrial production or cultivation of yeast. Consequently, since yeast has begun to be produced or cultivated on an industrial scale, it has become necessary to hold the aeration costs, in particular the power costs, as low as possible. It has been attempted to achieve this, for instance by improving the transfer of the air blown into the mash, to the yeast cells, by intensifying the phenomenon of diffusion of the oxygen from the mash into the yeast cells. Nearly the maximum possible utilisation of the air blown into the bulk of the mash is attained, when the offcoming air is practically free from oxygen. The particular aim is, thus, to give the yeast cells the opportunity and the time, to maintain intensive and enduring contact with the oxygen molecules in solution in the mash. This possibility is achieved, if the quantity of air blown into the bulk of the mash, is subdivided into extremely fine air bubbles, and these are retained in the mash for sufficient time to enable their absorption by the yeast cells. The qualitative advantages of small compared with large, air bubbles, are: a greater total surface area for the same quantity of air, smaller interstices between the small air bubbles, a slower rate of ascent of the bubbles in the mash, equivalent to a longer holding time, i.e. contact time, therein. An increased number of the bubbles, more concentrated layers of bubbles, increased contact surface, and longer contact times, lead to more numerous and more intensive diffusion events, and favour the absorption of the oxygen by the yeast cells. These qualities of the aeration process are ultimately determining for the quantity of yeast held in the mash, to produce breeding (multiplication) of the yeast cells.

The following aerating devices are known: perforated pipe coils in the bottom of the fermentation tank, diaphragm plates or pipes, ceramic elements, rotary assemblies of perforated tubes or vessels. However, none of these, hitherto known aerating devices, have yet been able to attain the aerating effect which is aimed at.

In the case of aerating elements in the form of metal pipes (tubes) or vessels, the forming of such small air exit orifices as would be essential for highly dispersed aeration, involve lower limits of a technical nature. In order, nevertheless, at least to approximate the desired effect, such aerating elements are made to rotate in the mash, so that the air bubbles forming at the air discharge orifices are swept away before attaining their normal size; but even this arrangement fails to attain the desirable efficacy of aeration. In addition, this method is associated with additional power consumption, since in addition to the expenditure of power in the production of compressed air, additional energy is needed for their rotation. Furthermore, such aeration elements are subjected to high frictional wear, since they must rotate with a considerable speed inside the mash, in order to obtain even approximately the aerating effect required.

If diaphragms or fruits are used, it is of course possible to produce very fine air bubbles, and thus a high aerating effect. In view of the small size of the pores in such aerating elements, however, their pore resistance is so high that with increasing head of the mash liquor in the tank, the power consumption becomes uneconomic. A further disadvantage of this form of aeration is, that if the air pressure falls inside the aerating elements, the pores can easily become blocked by penetrating particles of the mash. This drawback has in practice caused such finely disperse aeration to be abandoned, despite its qualitatively high efficiency.

That the efforts exerted hitherto, to obtain a better, more rational, and maximum possible aerating effect in yeast-bearing mashes, have been without appreciable success, is surely due to the fact that with known aerating systems, it has not been possible to obtain any, nearly complete, point-by-point aeration of the whole cross-section of the column of mash in the fermenting tank. Whether static pipe coils, diaphragms or ceramic elements are used, in all cases, structural and design considerations impose a comparatively wide spacing of the individual elements or air orifices, so that unaerated, vertical layers and regions are formed in the body of the mash. Similarly, in aerating systems in which for the production of small air bubbles, the mash is forced through the interstices of finely-porous aerating elements arranged on the bottom of the fermentation tank, the formation of unaerated layers and regions in the mash is not prevented, since sufficient space must still be left for the free flow of the mash liquor. Air jets issuing sideways from the aerating elements also fail to penetrate horizontally through the flowing mash to the requisite degree, even if a considerable air pressure is used.

A primary purpose of the present invention is, to obtain the maximum degree of aeration of yeast-containing mashes and thus a more desirable and economical production of bakers' yeast, by a particular design of the aeration system, using finely-porous aerating elements.

The invention is particularly characterized in that the aerating system consists of aerating elements radiating spirally from a central air-feed pipe, these being set at a particular angle of incidence to the longitudinal axis of the tank and so arranged reciprocally, that—in plan view —the aerating elements form an imbricated pattern having obliquely ascending, free passages. For this purpose the aerating elements are further made in the form of hollow bodies with sides of porous plate elements.

It is a further object that automatic safeguards be provided against blocking of the pores of the aerating elements if the air pressure falls, or the aerating system is stopped.

The aerating system is rotatable supported and the aerating elements are advantageously of triangular shape in cross-section, one face of the triangle being directed vertically or nearly so, in order to obtain a reactive force produced by the escape of the issuing air jets. Moreover, the aerating elements extend radially from the central air-feed pipe, substantially to the periphery of the tank.

In this manner, an aerating effect is produced, which will ensure the most intensive possible supply of oxygen to the yeast cells; the bulk of the mash is penetrated over the entire working cross-section of the tank by closely spaced air bubbles both horizontally and vertically. On the one hand, this requires only a comparatively moderate tank capacity. On the other hand, owing to the helically-spiral setting of the aerating elements, sufficiently large passages are left between the individual elements, to enable the mash to flow unhindered and at a suitable speed. In addition to the qualitative effect in the formation of fine air bubbles, such an aerating system presents the further, advantageous effect, that the vertical flow of the mash is laterally deflected by the oblique setting of the aerating elements, resulting in more intensive agitation of the mash and the contained yeast cells, while the upward flow paths of the mash are prolonged. Since fine air bubbles rise only slowly, they not only ascend vertically through the mash, but to a great extent participate in the turbulent motion thereof, before being separated and expelled, this effect being the greater, the greater the turbulence of the mash liquor. The transfer of oxygen from the air bubbles into the mash and the dissolved oxygen from the mash into the yeast cells, is facilitated by the increase in the number of contact events between oxygen molecules and yeast cells, due to the turbulent motion in the tank. This also intensifies the absorption of nutrients and nutrient salts, so that in general the biological medium for the growth of the yeast cells, becomes improved.

The turbulence in the mash liquor and the formation of small air bubbles can be further intensified by rotating the aerating elements. In the aerating system according to the present invention, no separate provision or expenditure for supplemental mechanical means or power is required to obtain such rotation; the rotation of the aerating elements being obtained per se by the reactive force or recoil of the air jets issuing from the pores of the vertical faces of the aerating elements themselves. The rotary motion of the aerating elements is further aided by directing the reflux of the deaerated mash tangentially to the vane-shaped aerating elements so that the twist of the mash flow is used to rotate the aerating elements.

With the fermenting liquor travelling in a continuous (closed) circuit, it is advantageous to return the deaerated fermentation liquor to the fermentation tank, through a bucket wheel. The rotation of this bucket wheel can also be utilized as a driving means for the aerating system. In this manner, the aerating system can be maintained in rotation by the flow energy of the mash liquor alone.

The invention provides an aerating arrangement in which the surface area of the aerating elements, i.e. the total discharge area of the air jets is at least equal to and more often many times greater than, the surface area of the column of mash in the tank. With this system, although the total quantity of air introduced is less, a high-quality, fine aeration of the mash liquor is attained, amounting practically to complete frothing of the whole body of the mash. The mash is thus so enriched with oxygen, that the yeast concentration in the mash liquor can be increased far above what has hitherto been possible. The resulting advantage in operating costs, consists particularly in that without any increase in the power take-off and other running expenses, the quantity of fresh yeast produced in each production run increases proportionally to the increased concentration of yeast in the liquor. Production costs are thus lowered, and in the outcome, the production of bakers' yeast is made more rational and economical.

The invention will now be described in the following under reference to an exemplary form of embodiment represented in the accompanying drawing.

FIG. 1 shows the arrangement of a device for continuous yeast culture in a saccharine mash in closed circuit, in a diagrammatic front view;

FIG. 2 is a top view of the arrangement according to FIG. 1;

FIG. 3 shows a top view of the arrangement of the aerating elements in the fermentation tank, on a different scale;

FIG. 4 shows the arrangement of an aerating element on the central air-feed pipe;

FIG. 5 is a side view of an aerating element on a larger scale.

The arrangement represented, for the production of yeast, comprises a tank 1 with a container 2, in which the aerating system 3 is accommodated. A pipe 4 for supplying the air to the mash, carries aerating elements 5 extending radially from the pipe 4 and located in the same plane. The aerating elements 5 are arranged in a helical spiral or fanwise, about the air feed pipe 4. These aerating elements 5 are closed, hollow bodies, the walls whereof are air-permeable. The hollow bodies 5 are connected by pipes 6 with the feed pipe 4, through which the air passes inside these aerating elements 5. The aerating elements 5 are of triangular cross-section, the side 7 of the triangle being suitably inclined at about 45° to the longitudinal axis of the feed pipe. Another side 8 of the triangle, is arranged substantially vertically, while the third side 9 of the triangle runs in an acute angle to the side 7. Each aerating element 5 extends nearly to the inner side of the periphery of the container 2. The aerating elements are arranged and attached to the air feed pipe in a helical spiral in such manner that, in plan view, the lower edge 10 of the aerating element 5 is at least below the lower edge of side 8 of the adjoining aerating element, or even slightly overlaps i.e., extends beyond the plane of said side as shown in FIGS. 1 and 3. This arrangement ensures that the entire cross-sectional area of the container 2, is occupied by the system of aerating elements. On account of the helical setting of the aerating elements 5, relatively large passages 11 (FIG. 5) are provided between the individual aerating elements, through which the mash liquor can pass unhindered.

The aerating element 5 itself is formed as a hollow body, suitably bounded on all sides by porous plates. These thin, porous plates may be of sinter material, metal or plastic. Consequently, the aerating element is on all sides porous and air-permeable. Such, fritted-type aerating elements have pore diameters of about 0.02–0.03 mm., allowing of forming air bubbles of about 0.9–1.00 mm. diameter. The colum of mash liquor contained in the vessel 2, is thus traversed vertically by chains of air bubbles at practically all points. In the aerating system represented, air bubbles pass through the mash liquor, not only from the porous surface 7, but also from the other surfaces 8 and 9, including their edges, and from the end faces 12 and 13 of the aerator bodies 5. Thus, full assurance is given, that no part of the liquid column will remain without intensive aeration, and the fermenting liquid is traversed by closely-spaced trains of air bubbles, both horizontally and vertically. Since the liquid passes across all the surfaces, 7 as well as 8 and 9, with a certain velocity, the air bubbles issuing from the aerating elements 5 become even further subdivided.

The helically-spiral arrangement of the aerating elements 5 on the pipe 4, which is rotatable in the bearings 14 and 15, produces an automatic rotation of the whole aerating system 4, 5, by the action of the recoil force produced by the air issuing from the pores of the surfaces 8. The turbulent agitation of the mash liquor and the formation of fine air bubbles is further promoted by this automatic rotation of the aerating system; without requiring further mechanical power for this purpose.

The tank 1 has in addition to the yeast culture chamber or container 2, also a container element 2a for the circulation of the processed fluid, in which a refrigerator unit 16 can be arranged. This cooler 16 is connected with a cooling-water feed 17 and a cooling-water discharge 18. The containers 2 and 2a are interconnected at the top by the pipe or passageway 19. The liquid returns through the bottom pipe 20. This last is suitably led from the container compartment 2a, to the container 2 in a tangential direction, according to the direction of rotation of the arerating system 5, i.e. enters the container 2 tangentially.

The container compartment 2a can be arranged to receive a bucket wheel 21, rotating on a horizontal shaft 22. The bucket wheel 21 is supplied by a feeder funnel 23. The compartment 2a may further be equipped with feed pipes 24, 25, 26. One of these is used for supplying the fermentation liquid, while the other two feeds can be used for supplying a nutrient solution or a solution of nutrient salts respectively. The pipe 27 is an air escape, while the pipe 28 incorporates a drain cock for emptying the tank. The pipe 29 is the tapping point for the new yeast formed.

The buckets of the bucket wheel 21 receive the solutions coming from the feed pipes 25 and 26 and entering the mash liquor, as well as the de-aerated mash bulk flowing into the compartment 2a. The weight of the filled buckets causes the wheel 21 to rotate. This rotation can be utilised through suitable transmission elements such as shafts 42 and bevel gears 43, to rotate the aerating system 4, 5. By this means, the continuous circulation of the fermentation solution is used as a further, free source of power for rotating the entire aerating system.

In order to prevent clogging of the finely-porous aerating elements 5 by penetrating particles of the mash when the system is stopped, the aerating system incorporates automatically-acting safety devices. The air feed pipe 4 is made vertically slidable. It is influenced by a counterweight 30, the mass of which is so regulated, that as long as the pressure inside the aerating system is too low for proper aeration, the aerating elements 5 remain held above the level of the mash in the tank 31. Aeration is provided by an air compressor 32 with a driving motor 33. From the compressor 32, a pipe 34 leads through rollers 35 and 36 to the upper end of the feed pipe 4. The upper part of the pipe 34 consists of a flexible hose. The counterweight 30, which is suspended by the cord 37 from the upper end of the air feed pipe 4 and runs over the rollers 38 rotatably mounted on the bracket 39, works in a cylinder 40, the weight 30 being either directly shaped to form a piston or plunger, or being linked with such a piston or plunger, working in the cylinder 40. The cylinder 40 is connected by means of the pipe 41, with the pipe 34. When aerating pressure is applied to the aerating system, the pressure in the cylinder 40 also rises, whereby the weight 40 is driven upwards. Consequently, the air feed pipe 4 falls with the aerating elements 5, to the prescribed depth in the mash liquor. When the aerating pressure drops, the air pressure in the cylinder 40 also decreases. Consequently, the counterweight 30 moves downward and draws the air feed pipe 4 with the aerating elements 5, upwards, i.e. out of the mash liquor. In this manner it is reliably ensured that while no aeration is being applied, the aerating elements 5 remain outside the mash liquor and their pores cannot thus become blocked by penetrating mash particles. This safety device enables the use of finely-porous aerating elements while the installation is always immediately ready for use. The working pressure of the air is suitably 0.3 to 0.5 atsmosphere gauge.

The air feed pipe 4 can likewise be made telescopic. The installation described, is intended principally for the production of bakers' yeast in a continuous process with recirculation of the fermenting liquid, the new yeast growth being continuously withdrawn and substituted by the continuous addition of equivalent volumes of nutrient solution and nutrient salts to the mash liquor, so that the quantity of the fermenting liquid in the fermentation tank, remains constant.

What is claimed is:
1. In a device for aerating fermenting liquids in particular for the production of bakers' yeast, the improvement comprising: an upright fermentation vessel, an air feed pipe extending in the direction of the longitudinal axis of said fermentation vessel, a series of aerating elements connected to and having openings leading from said pipe, said elements extending radially from said pipe, said elements comprising hollow bodies having porous walls, said elements being arranged in a helically-spiral imbricated pattern, the overlapping edges of said elements being spaced to provide passages for flow of fermentation liquid therebetween, said elements being each set at a predetermined angle to the longitudinal axis of said fermentation vessel.

2. A device in accordance with claim 1 wherein means slidably moves said air feed pipe together with said aeration elements in the direction of the longitudinal axis of said vessel, means automatically withdrawing therefrom said pipe and aeration elements in dependence on the pressure of the air feed.

3. A device in accordance with claim 1 wherein the walls of said hollow bodies are composed of porous material.

4. A device in accordance with claim 1 wherein said aerating elements in vertical cross-section are triangular in shape, one wall thereof being substantially vertical to provide a substantially horizontal force of reaction by issuance of air from the pores thereof.

5. A device in accordance with claim 1 wherein said air feed pipe is substantially centrally located in said vessel and said aerating elements extend outwardly therefrom substantially to the inner wall of said vessel.

6. A device in accordance with claim 1 wherein means rotatably support said feed pipe together with said aerating elements.

7. A device in accordance with claim 1 wherein said feed pipe together with said aerating elements is counterbalanced by a balance weight, means moving said feed pipe together with said aerating elements and said balance weight in response to variations in the pressure of said air feed.

8. A device in accordance with claim 7 wherein said balance weight consists of a piston movable in a cylinder.

9. A device in accordance with claim 6 wherein said vessel is provided with an exit passageway interconnecting said vessel with a compartment equipped with cooling means, and with a return pipe leading into said vessel from said compartment tangentially in the direction of rotation of said feed pipe and aerating elements.

10. A device in accordance with claim 6 wherein a bucket wheel is provided with means to direct the flow of fermentation liquid thereto, said bucket wheel being mechanically interconnected with said rotatably supported air feed pipe and acting as the driving means for rotation thereof.

11. A device in accordance with claim 10 wherein said bucket wheel is drivingly interconnected with said rotatably supported air feed pipe for rotation thereof by shaft and gear means.

References Cited by the Examiner

UNITED STATES PATENTS

| | | | |
|---|---|---|---|
| 1,383,881 | 7/1921 | Thomas | 261—87 |
| 2,041,184 | 5/1936 | Isenhour | 261—87 |
| 2,061,564 | 11/1936 | Drake et al. | 261—84 |
| 3,068,155 | 12/1962 | Stich | 195—142 |

HARRY B. THORNTON, *Primary Examiner.*

RONALD R. WEAVER, *Examiner.*